United States Patent

Grassmann

[11] Patent Number: 4,461,198
[45] Date of Patent: Jul. 24, 1984

[54] SAWBLADE

[76] Inventor: Günther Grassmann, Eddesse, 3155 Edemissen 4, Fed. Rep. of Germany

[21] Appl. No.: 548,229

[22] Filed: Nov. 2, 1983

Related U.S. Application Data

[63] Continuation of Ser. No. 257,406, Apr. 24, 1981, abandoned.

[30] Foreign Application Priority Data

Apr. 30, 1980 [DE] Fed. Rep. of Germany ....... 3016660

[51] Int. Cl.³ ...................... B23D 61/02; B27B 33/08
[52] U.S. Cl. ...................................... 83/835; 83/852; 83/855
[58] Field of Search .................. 83/835, 852, 854, 855

[56] References Cited

U.S. PATENT DOCUMENTS

| 1,336,209 | 4/1920 | Driver | 83/852 |
| 3,362,446 | 1/1968 | Potomak | 83/855 |
| 4,135,421 | 1/1979 | Bertram et al. | 83/835 |

FOREIGN PATENT DOCUMENTS 894763 10/1953 Fed. Rep. of Germany.

*Primary Examiner*—Donald R. Schran
*Attorney, Agent, or Firm*—Michael J. Striker

[57] ABSTRACT

A sawblade has teeth of a height corresponding to the thickness of the blade and chip spaces in the interstices between respective teeth opening into both sides of the blade; the bottoms of alternate chip spaces are inclined to opposite sides of the blade whereby the maximum depth of the chip spaces corresponds to a multiple of the height of the teeth.

5 Claims, 4 Drawing Figures

SAWBLADE

This is a continuation of application Ser. No. 257,406, filed Apr. 24, 1981, now abandoned.

BACKGROUND OF THE INVENTION

The invention relates to sawblades, and in particular to a circular sawblade with teeth having a height corresponding substantially to the thickness of the blade, cutting edges extending over the entire thickness of the blade, and chip spaces formed in interstices between respective teeth and opening into both sides of the blade to receive chips of the cut material.

In principle, it is desirable to increase the number of teeth in sawblades, inasmuch as load against each tooth depends invariably on the number of teeth, that is with increasing number of teeth the unit stress decreases. This principle is of importance particularly for hot iron saws and separating saws in cutting hard materials exhibiting large cutting resistance. The provision of fine toothing of this kind results, however, in individual teeth of a relatively narrow cross-section, so that the height of respective teeth must also be held relatively low. Since chip spaces for receiving chips of the process material correspond in depth to the height of the teeth, the resulting chip spaces must of necessity be designed also relatively small and consequently the chips have the tendency to clog the minute spaces already after a relatively short cutting interval.

SUMMARY OF THE INVENTION

It is therefore a general object of the present invention to overcome the aforementioned disadvantages.

More particularly, it is an object of the invention to provide an improved sawblade with fine teeth of the aforedescribed type, which is capable of removing more chips of the processed material without impairing its edge like.

In keeping with these objects, and others which will become apparent hereafter, one feature of the invention resides, in a sawblade with fine teeth having a height corresponding substantially to the thickness of the blade and cutting edges on the teeth extending over the entire thickness of the blade, in the provision of chip spaces in interstices between respective teeth, which open into both sides of the blade and having inclined bottoms gradually increasing in depth to reach a maximum depth amounting to a multiple of the height of the teeth.

Preferably, the bottom of each alternate chip space is sloping to a different side of the blade. In a modification, it is also possible that the bottom of each chip space has a wedge-like configuration mirror-symmetrically arranged between both sides of the blade. In this case, the apex of the wedge is situated approximately midway between the two sides defining the width of respective teeth. The preferred embodiment, however, is that in which the bottoms of the chip spaces are inclined in one direction over the entire width of the blade and alternate in the direction of their inclination.

The cutting edges of the teeth preferably are directed parallel to each other and so are lateral side walls of the chip spaces formed by the flanks of the teeth. Nevertheless, in another modification it is also possible that each chip space tapers inwardly and/or diverges to the side surface of the blade where it has the maximum depth. In this construction the chip spaces can be manufactured on a correspondingly conically shaped milling cutter or broacher. In this construction, in which the chip spaces extend conically towards the side surfaces of the blade, the cutting edges are no longer arranged in parallel.

The bottom of each chip space can be either in the form of a flat surface sloping along a straight line or in the form of a profiled flute.

With the sawblade according to this invention having clearance between the tips of the teeth of about 5 mm it is possible to cut materials which with the use of sawblades having conventional toothing would not be separable. Chip spaces formed in accordance with this invention in comparison with prior-art sawblades are capable of receiving and effectively discharging a substantially larger amount of chips without impairing the strength of the teeth. The new design results furthermore in an elastic, compound toothing which has particularly advantageous cooling effects at critical points. By virtue of the substantially increased average depths of the chip spaces, a fast cooling takes place on large areas; accumulation of heat is eliminated inasmuch as the critical or endangered points are on saw teeth having a relatively thin-walled configuration and consequently heat can quickly dissipate on both sides of the teeth.

Due to the novel staggered arrangement of the chip spaces, the teeth are uniformly exposed to compressive and propelling forces or stresses, and the relatively narrow teeth are statically stabilized. Only the self-supporting parts of the teeth having minimum height are subject to wear, and consequently the leverage is very small and due to the possibility of still increasing the number of fine teeth the wear and leverage are minimized. The wear of teeth does not impair the capacity of the chip spaces. Of most importance, however, is the fact that the depth of the chip spaces can be arbitrarily restored downwardly whereas only a negligible restoring work is needed in the upper part of the spaces.

Because of the novel combined system of the teeth with alternatively inclined chip spaces, the dangerous formation of cracks in the root circle of the teeth is avoided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
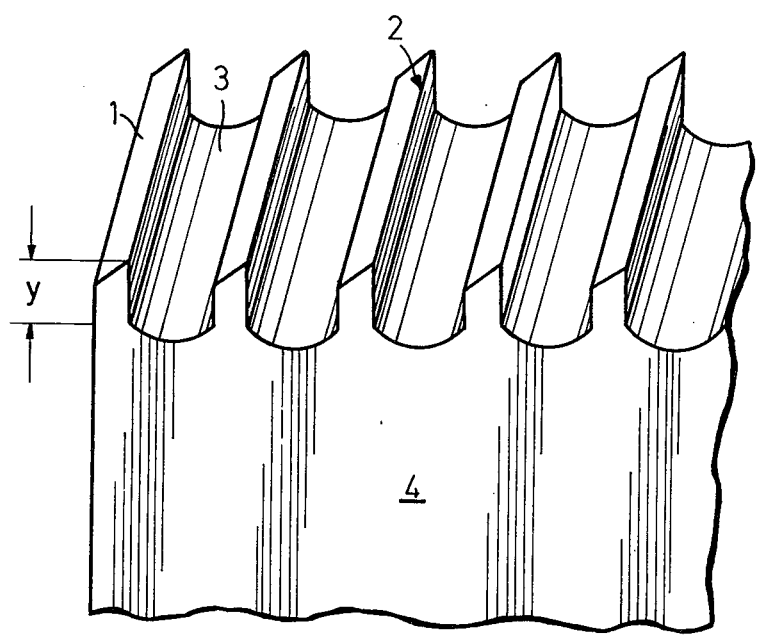
FIG. 1 is an isometric view of a cut away part of a prior-art sawblade.

In a known sawblade depicted in FIG. 1 as a cut away segment of a circular sawblade, teeth 1 extend over the entire width of the blade and are provided with straight cutting edges 2. In the interstices between respective teeth there are formed chip spaces 3 for receiving chips from the cut. As can be seen from this example of known sawblade, height y of respective teeth corresponds to the depth of the chip spaces and consequently the accumulation capacity of the chip spaces is determined primarily by the height of the teeth 1.

Figure 2:
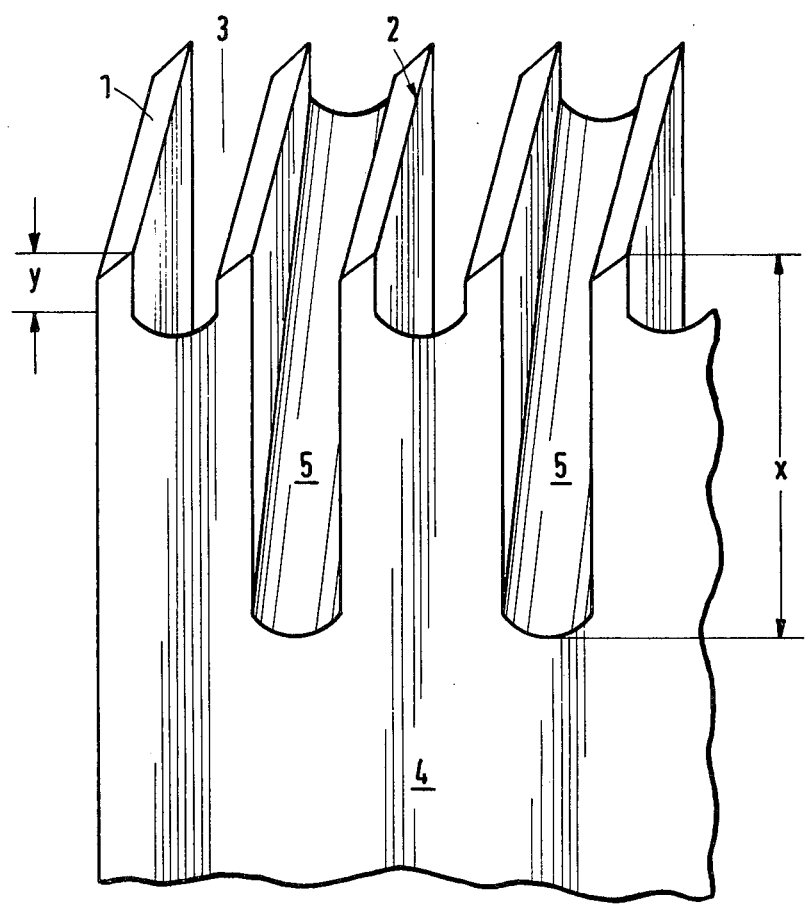
FIG. 2 is a similar view of a sawblade according to this invention.

Referring now to FIG. 2, depicting an exemplary embodiment of a sawblade 4 according to this invention, it will be noted that, for the sake of comparison with prior-art blades according to FIG. 1, the clearance between the tips of respective teeth is selected to be the same.

According to this invention, chip spaces in the interstices between teeth 1 have radially sloping bottom portions 5, whereby at one side of the blade the spaces 3 have a depth corresponding substantially to that of prio-art chip spaces, whereas at the other side of the blade the depth of each space corresponds to a multiple of the height y of the teeth 1. It will be seen from FIG. 2 that in the preferred embodiment of this invention each alternate chip space 3 has its sloping bottom portion 5 directed to opposite sides of blade 4, whereby the maximum depth x exceeds multiple times the height y of the teeth. The sloping bottom 5 of each chip space 3 in this example is inclined along a straight line and is in the form of a curved flute.

Figure 3:
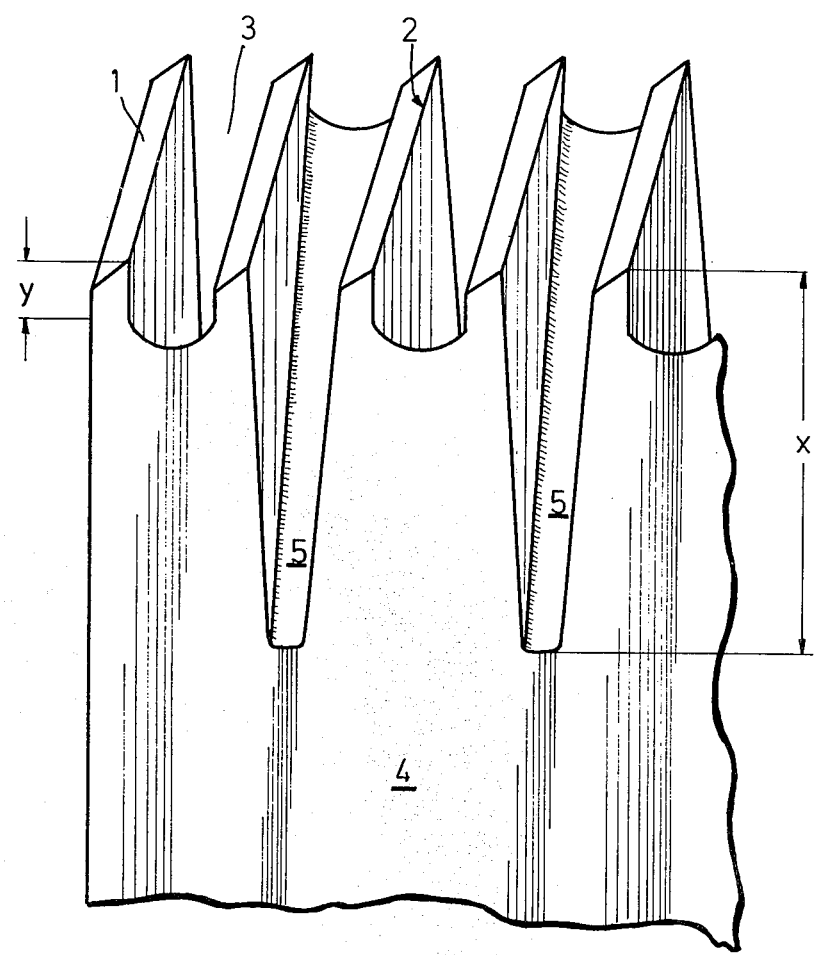
FIGS. 3 and 4, respectively, are modifications of the saw blade of FIG. 2.
Figure 4:
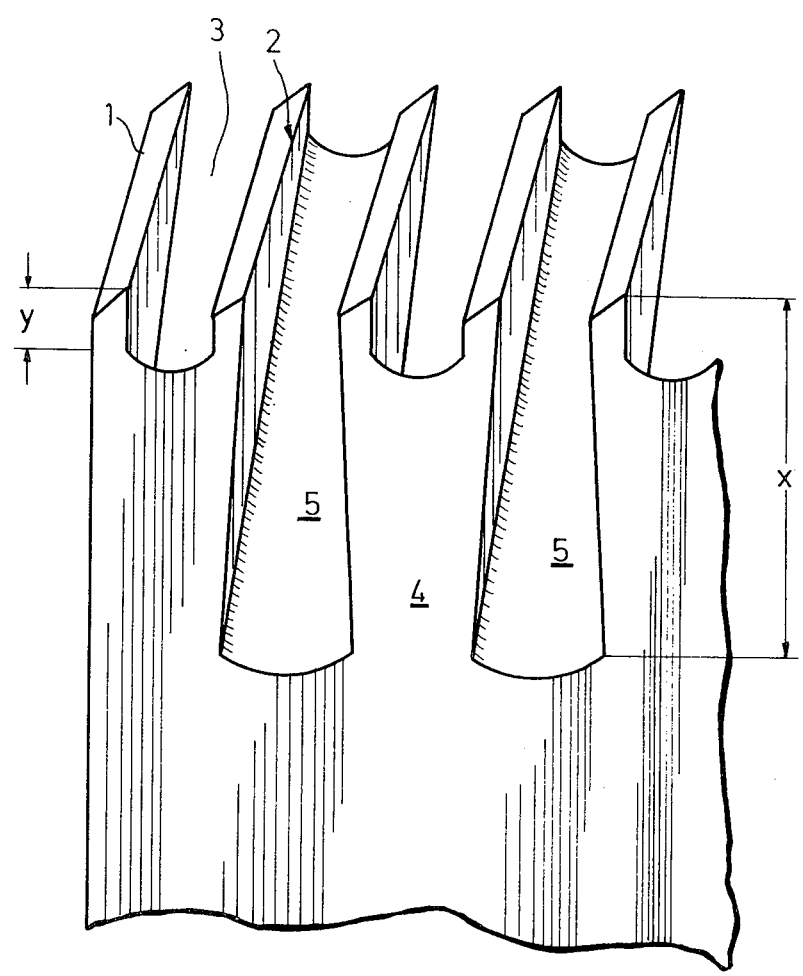

In the embodiment according to FIG. 3, the sloping bottom portion 5 with its side walls in respective chip spaces taper inwardly, whereas in the modification of FIG. 4 the bottom portion 5 and the corresponding side walls diverge in the direction of increasing depth of the chip spaces.

It will be understood that each of the elements described above, or two or more together, may also find a useful application in other types of constructions differing from the types described above. For example, the arrangement according to this invention can be employed also on straight sawblades instead of circular ones. In another modification, the bottoms 5 of respective chip spaces need not be directed radially but can form an oblique angle relative to the side surface of the blade.

While the invention has been illustrated and described as embodied in a specific example of a sawblade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A saw blade with fine teeth of a height which is within the range of the thickness of the blade and having cutting edges corresponding in width to the thickness of the blade, comprising chip spaces formed in interstices between respective teeth, the alternate chip spaces opening into opposite sides of the blade and having at its one side a depth corresponding to the height of the teeth and at its other side an inclined bottom sloping along a straight line from the depth of the one side and at an angle at which a maximum depth reaches the multiple of the height of the teeth, and the length of the chip spaces being considerably greater than their width.

2. A sawblade as defined in claim 1, wherein said cutting edges extend parallel to each other.

3. A sawblade as defined in claim 1, wherein the walls of respective chip spaces extend parallel to each other.

4. A sawblade as defined in claim 1, wherein the side walls of respective chip spaces taper inwardly.

5. A sawblade as defined in claim 1, wherein the side walls of respective chip spaces diverge in the direction of increasing depth of the spaces.

* * * * *